(12) United States Patent
Goulds et al.

(10) Patent No.: US 10,137,462 B2
(45) Date of Patent: Nov. 27, 2018

(54) DEBRIS SEPARATOR

(71) Applicant: ROLLS-ROYCE plc, London (GB)

(72) Inventors: Robert Goulds, Derby (GB); Roger A Sutherland, Debry (GB)

(73) Assignee: ROLLS-ROYCE plc, London (GB)

(*) Notice: Subject to any disclaimer, the term of this patent is extended or adjusted under 35 U.S.C. 154(b) by 194 days.

(21) Appl. No.: 15/235,637

(22) Filed: Aug. 12, 2016

(65) Prior Publication Data

US 2017/0065986 A1 Mar. 9, 2017

(30) Foreign Application Priority Data

Sep. 8, 2015 (GB) .................................. 1515859.5

(51) Int. Cl.
| | | |
|---|---|---|
| *B04C 3/06* | (2006.01) | |
| *F02C 7/22* | (2006.01) | |
| *B01D 21/26* | (2006.01) | |
| *B04C 9/00* | (2006.01) | |

(Continued)

(52) U.S. Cl.
CPC ............. *B04C 3/06* (2013.01); *B01D 21/267* (2013.01); *B04C 9/00* (2013.01); *F02C 7/222* (2013.01);
(Continued)

(58) Field of Classification Search
CPC .. B01D 21/26; B01D 21/267; B01D 17/0217; B01D 19/0057; B01D 45/16; B04C 9/00;
(Continued)

(56) References Cited

U.S. PATENT DOCUMENTS

| | | | |
|---|---|---|---|
| 4,008,059 A | | 2/1977 | Monson et al. |
| 4,094,772 A | * | 6/1978 | Hillekamp ................ B04C 9/00 |
| | | | 209/44.1 |

(Continued)

FOREIGN PATENT DOCUMENTS

| | | |
|---|---|---|
| EP | 2251074 A1 | 11/2010 |
| GB | 1584574 A | 2/1981 |

(Continued)

OTHER PUBLICATIONS

Jan. 27, 2016 Search Report issued in British Patent Application No. 1515959.5.
Jan. 18, 2017 Search Report issued in European Patent Application No. 16 18 4043.

*Primary Examiner* — Claire A Norris
(74) *Attorney, Agent, or Firm* — Oliff PLC (57) ABSTRACT

A centrifugal debris separator for removing debris from a gas turbine engine fuel system comprises a debris separator inlet, a debris separator outlet and a separating chamber with a centerline extending in an axial direction and defined by an outer wall formed around the centerline. The separating chamber comprises a separating chamber inlet for receiving fluid, a first separator outlet to the separating chamber, a second separator outlet to the separating chamber provided to the outer wall of the separating chamber and a third separator outlet to the separating chamber defined by a third separator outlet wall formed around the centerline of the separating chamber. The debris separator inlet is fluidly connected to the separating chamber inlet. The debris separator outlet is fluidly connected to the first separator outlet.

20 Claims, 7 Drawing Sheets

(51) Int. Cl.
  *F23K 5/00*  (2006.01)
  *F23K 5/18*  (2006.01)

(52) U.S. Cl.
  CPC .............. *F23K 5/007* (2013.01); *F23K 5/18* (2013.01); *B04C 2009/002* (2013.01); *F05D 2220/32* (2013.01)

(58) Field of Classification Search
  CPC .............. B04C 3/06; B04C 2009/002; B04C 2003/006; F02C 7/22; F02C 1021/267; F02C 7/222; F23R 3/28; F23K 5/007; F23K 5/18; F05D 2220/32
  USPC .................... 209/725; 210/787, 781; 96/208
  See application file for complete search history.

(56) References Cited

U.S. PATENT DOCUMENTS

| | | | |
|---|---|---|---|
| 5,028,318 A * | 7/1991 | Aslin | .................. B01D 21/02 209/725 |
| 5,934,484 A | 8/1999 | Grimes | |
| 2004/0256312 A1 | 12/2004 | Gomez | |
| 2012/0233973 A1 | 9/2012 | Sedillo | |
| 2015/0344787 A1* | 12/2015 | Henson | .................. C10G 2/34 518/704 |

FOREIGN PATENT DOCUMENTS

| | | | |
|---|---|---|---|
| GB | 2177949 A | 2/1987 | |
| WO | 00/29123 A1 | 5/2000 | |
| WO | 03/045525 A1 | 6/2003 | |

* cited by examiner

DEBRIS SEPARATOR

BACKGROUND

1. Field of the Disclosure

The present disclosure concerns a centrifugal debris separator, and/or a fuel supply apparatus, and/or a fuel system debris separator, and/or a method of separating debris from a fluid.

2. Description of the Related Art

Gas turbine engines are typically employed to power aircraft. A gas turbine engine comprises various stages of rotor blades and a combustor. Typically, a gas turbine engine would have at least one compressor rotor stage, and at least one turbine rotor stage, with the combustor located between the compressor and the turbine.

Typically, fuel is supplied to the gas turbine engine from storage tanks on the aircraft. However particulates and/or contaminants can exist in the fuel tanks and these can be carried by the fuel into the fuel system. The fuel itself can contain its own particulates and/or contaminants and due to the wide range of environmental conditions in which an aircraft operates the particles/contaminants may include ice. In general particles/contaminants may be referred to as debris. Debris can have density greater or less than the density of the fuel. It is desirable to remove debris from the fuel at least because debris can block parts of the fuel system, for example a heat exchanger matrix.

Conventional aircraft fuel systems may contain filters to remove debris but a pressure drop is associated with each filter. It is desirable to remove a range of debris from a fuel system whilst minimising the pressure losses associated with debris removal.

OBJECTS AND SUMMARY

According to an aspect there is provided a centrifugal debris separator for removing debris from a gas turbine engine fuel system comprising a debris separator inlet, a debris separator outlet and a separating chamber with a centreline extending in an axial direction and defined by an outer wall formed around the centreline. The separating chamber comprises a separating chamber inlet for receiving fluid, a first separator outlet to the separating chamber, a second separator outlet to the separating chamber provided to the outer wall of the separating chamber and a third separator outlet to the separating chamber defined by a third separator outlet wall formed around the centreline of the separating chamber. The debris separator inlet is fluidly connected to the separating chamber inlet. The debris separator outlet is fluidly connected to the first separator outlet.

According to an aspect there is provided a method of separating debris from a fluid, containing light and heavy debris particles (flowing through a gas turbine engine fuel system centrifugal debris separator) the method comprising rotating a flow of fluid about a rotational axis such that the density of the debris particles increases with distance from the rotational axis. The method comprises separating an outer portion of the flow through a second separator outlet to the centrifugal debris separator. The method comprises separating an inner portion of the flow through a third separator outlet to the centrifugal debris separator. The method comprises ejecting the flow not included in the outer portion or the inner portion through a first separator outlet to the centrifugal debris separator.

Debris may include (purely by way of example only) particulates, contaminants and/or fibres. The debris may be suspended in the fluid that passes into and/or through the centrifugal debris separator and/or distributed within the fluid. In this disclosure heavy debris may refer to debris that has a density greater than the density of the fluid. In this disclosure light debris may refer to individual debris that has a density less that the density of the fluid.

The light debris may be greatest in concentration at the rotational axis of the fluid. The heavy debris may be greatest in concentration at the radial outer extent of the rotating fluid. An inner portion of the flow may be the flow closest to the rotational axis of the flow. An outer portion of the flow may be the flow that is closest to the outer radial extent of the flow compared to the rotational axis.

The third separator outlet wall may be closer to the centreline than the outer wall of the separating chamber is to the centreline. The third separator outlet may be located to accept the part of the flow that contains the greatest concentration of light debris and/or a part of the flow that has a greater concentration of light debris than the average concentration in the flow and/or flow that comprises debris with a lower average density than the average density in the fluid as a whole.

The rotational axis of the rotating flow may be a centreline extending in an axial direction of the separating chamber.

In use, a fluid containing debris may flow from an inlet of the centrifugal debris separator (for example the debris separator inlet and/or the separating chamber inlet) to an outlet (for example the first separator outlet, and/or the second separator outlet, and/or the third separator outlet, and/or the debris separator outlet) of the centrifugal debris separator. If a second position is closer than a first position is to an inlet of the centrifugal debris separator then, in respect of the direction of the flow of fluid, it may be referred to as upstream in this disclosure. If a second position is closer than a first position is to an outlet in respect of the direction of the flow of fluid it may be referred to as downstream in this disclosure.

The second separator outlet may be located axially between the separating chamber inlet and the first separator outlet. The second separator outlet may be located downstream of the separating chamber inlet. The second separator outlet may be located upstream of the first separator outlet.

The second separator outlet may be defined by a second separator outlet wall. The second separator outlet wall may form a spiral shape in a plane normal to the axial direction (which may be referred to as an axial plane). The second separator outlet wall may form a spiral shape, in an axial plane, around the outer wall of the separating chamber. The second separator outlet wall may form at least a part of the outer wall of the separating chamber.

The second separator outlet may be of a "snail shell" shape. The second separator outlet may form a circumferential recess (or channel) in the separating chamber outer wall that extends at least part way around the circumference of the separating chamber outer wall. The recess (or channel) may extend to a radial position outside of the separating chamber outer wall. The recess may increase in depth with angular position. The recess may be connected to a passageway at its deepest position. The recess may blend into the separating chamber outer wall at its shallowest position.

The outer wall of the separating chamber may have a circular cross section. The separating chamber may be formed of a pipe. The separating chamber may have a greater diameter at the location of the second separator outlet than at the separator inlet and/or the separator outlet.

The third separator outlet wall may have a circular cross section and/or may optionally be centred on the centreline of the debris separator. The third separator outlet wall may be radially closer to the centreline than the second separator outlet is to the centreline.

The third separator outlet may be formed of a passageway that extends into the separating chamber. The third separator outlet may be formed of a pipe. The third separator outlet passageway (or pipe) may extend in an axial direction at the position that the flow enters the third separator outlet. The third separator outlet passageway (or pipe) may comprise a bend. The bend may be within the separating chamber. The third separator outlet passageway (or pipe) may pass through the separating chamber outer wall.

The first separator outlet may surround (for example radially surround) the third separator outlet. The first separator outlet may coaxially surround the third separator outlet.

The centrifugal debris separator may comprise a vortex generator. The vortex generator may be located between the debris separator inlet and the second separator outlet. The vortex generator may be located between the debris separator inlet and the third separator outlet. The vortex generator may be downstream of the debris separator inlet. The vortex generator may be upstream of the second separator outlet. The vortex generator may be upstream of the third separator outlet.

The vortex generator may comprise a static obstruction. The static obstruction may comprise static blades. The static blades may be for deflecting the flow of fluid. The static blades may be for imparting rotational (or angular) momentum to the fluid. The static blades may be helical in shape. The static blades may be flat. The static obstruction may comprise a static central hub. Static blades may extend from a static central hub. Such a static central hub may be axially aligned.

The vortex generator may comprise a drivable arrangement. The drivable arrangement may comprise drivable blades. The drivable arrangement may comprise a drivable central hub. The blades may extend from the drivable central hub. The drivable central hub may extend in an axial direction. The drivable arrangement may be rotatable about the drivable axial hub. The drivable arrangement may be for imparting rotational momentum to the fluid. The centrifugal debris separator may comprise a driving mechanism for driving such a vortex generator.

The vortex generator may comprise a vortex pipe section that has a vortex pipe outer wall that forms a spiral shape such that rotational momentum is imparted to a flow passing through it.

The separating chamber inlet may be aligned with a direction other than the separating chamber centreline (for example a direction that comprises a component in the circumferential direction of the separating chamber) such that when the fluid enters the separating chamber by the separating chamber inlet it rotates around the separating chamber centreline.

The centrifugal debris separator may comprise a flow straightener. The flow straightener may be located between the debris separator outlet and the second separator outlet. The flow straightener may be located between the debris separator outlet and the third separator outlet. The flow straightener may be located upstream of the debris separator outlet. The flow straightener may be located downstream of the second separator outlet. The flow straightener may be located downstream of the third separator outlet. The flow straightener may comprise straightener blades. The straightener blades may be helical. The straightener blades may be flat. The flow straightener may comprise a straightener central hub. The straightener blades may extend from the straightener central hub.

The first separator outlet may be aligned with a direction other than the separating chamber centreline (for example a direction that comprises a component in the circumferential direction of the separating chamber) such that when the fluid leaves the separating chamber by the first separator outlet it removes any rotation of the fluid, for example aligns the fluid flow with the axial direction.

The centrifugal debris separator may comprise a heavy debris filter arrangement. The heavy debris filter arrangement may be fluidly connected to the second separator outlet.

The heavy debris filter arrangement may comprise a heavy debris filter chamber. The heavy debris filter chamber may be connected to the second separator outlet by a pipe (or passageway). The heavy debris filter arrangement may comprise a heavy debris filter. The heavy debris filter arrangement may comprise a plurality of filters. The heavy debris filter may be releasably attached to the heavy debris filter chamber.

The centrifugal debris separator may comprise a heavy debris return inlet. The heavy debris return inlet may be located between the first separator outlet and the debris separator outlet. The heavy debris return inlet may be located upstream of the debris separator outlet. The heavy debris return inlet may be located downstream of the first separator outlet. The heavy debris filter arrangement may be fluidly connected between the second separator outlet and the heavy debris return inlet.

The heavy debris filter arrangement may comprise a release mechanism that allows the heavy debris filter arrangement to be removed. The heavy debris filter arrangement release mechanism may comprise, for example, bolts.

The centrifugal debris separator may comprise a light debris filter arrangement. The light debris filter arrangement may be fluidly connected to the third separator outlet.

The light debris filter arrangement may comprise a light debris filter chamber. The light debris filter chamber may be connected to the third separator outlet by a pipe (or passageway). The light debris filter arrangement may comprise a light debris filter. The light debris filter arrangement may comprise a plurality of filters. The light debris filter may be releasably attached to the light debris filter chamber.

The light debris return inlet may be located between the first separator outlet and the debris separator outlet. The light debris return inlet may be located upstream of the debris separator outlet. The light debris return inlet may be located downstream of the first separator outlet. The light debris filter arrangement may be fluidly connected between the third separator outlet and the light debris return inlet.

The light debris filter arrangement may comprise a release mechanism that allows the light debris filter arrangement to be removed. The light debris filter arrangement release mechanism may comprise, for example, bolts.

The centrifugal debris separator may comprise a common debris filter arrangement. The common debris filter arrangement may be fluidly connected to the second separator outlet and/or the third separator outlet.

Such a common debris filter arrangement may comprise a common debris filter chamber. The common debris filter chamber may be connected to the second separator outlet and/or the third separator outlet by a pipe (or passageway). The common debris filter arrangement may comprise a common debris filter. The common debris filter arrangement may comprise a plurality of filters. The common debris filter may be releasably attached to the common debris filter chamber.

The centrifugal debris separator may comprise a common debris return inlet. The common debris return inlet may be located between the first separator outlet and the debris separator outlet. The common debris return inlet may be located upstream of the debris separator outlet. The common debris return inlet may be located downstream of the first separator outlet. The common debris filter arrangement may be fluidly connected between the second separator outlet and the common debris return inlet and/or between the third separator outlet and the common debris return inlet.

The common debris filter arrangement may comprise a release mechanism that allows the common debris filter arrangement to be removed. The common debris filter arrangement release mechanism may comprise, for example, bolts.

The debris separator inlet may be the separating chamber inlet. The debris separator outlet may be the first separator outlet.

According to an aspect there is provided a fluid supply apparatus for the fuel system of a gas turbine engine that comprises a fluid input pipe, a fluid output pipe and a centrifugal debris separator for removing debris as described and/or claimed herein. The debris separator inlet may be releasably attached to the fluid input pipe (for example by bolts secured around a flange). The debris separator outlet may be releasably attached to the fluid output pipe (for example by bolts secured around a flange).

The fluid supply apparatus may comprise a replacement pipe. The replacement pipe may be configured to attach between the fluid input pipe and the fluid output pipe. The replacement pipe may be a straight section of pipe, or a curved section of pipe.

In a method of removing the fluid supply apparatus, the centrifugal debris separator may be removed by releasing the attachments between the centrifugal debris separator and the fluid input pipe, and the centrifugal debris separator and the fluid output pipe. The replacement pipe may be attached between the fluid input pipe and the fluid output pipe.

The replacement pipe may be releasably attached to the fluid input pipe and/or the fluid output pipe. The replacement pipe may be welded to the fluid input pipe and/or the fluid output pipe (or permanently attached by other means).

A fuel system debris separator for a gas turbine engine may comprise a centrifugal debris separator as described and/or claimed herein for removing debris, including, for example, heavy debris and/or ice from a gas turbine engine fuel.

According to an aspect there is provided a gas turbine engine comprising the centrifugal debris separator as described and/or claimed herein.

The debris may include, for example, build and/or manufacturing contaminants from the aircraft wing tanks that are carried by the fuel to the engine fuel system.

In a method of separating debris from a fluid as described and/or claimed herein, the method may comprise filtering the flow that has been separated by the second separator outlet. The filtered flow from the second separator outlet may be returned back to the centrifugal debris separator. The method may comprise filtering the flow that has been separated by the third separator outlet. The filtered flow from the third separator outlet may be returned back to the centrifugal debris separator.

The skilled person will appreciate that except where mutually exclusive, a feature described in relation to any one of the above aspects may be applied to any other aspect. Furthermore except where mutually exclusive any feature described herein may be applied to any aspect and/or combined with any other feature described herein.

Centrifugal debris separators and/or methods of separating debris as described and/or claimed herein may remove debris whilst providing a low pressure drop across the system. The centrifugal debris separator can remove both heavy and light debris whilst providing a low pressure drop across the system. Optionally, the centrifugal debris separator can clean the fuel tanks of an aircraft. The fluid supply apparatus can clean the fuel tanks of the aircraft and then replace the centrifugal separator with a replacement pipe thereby reducing the pressure drop once the tanks are cleaned.

BRIEF DESCRIPTION OF THE DRAWINGS

Embodiments will now be described by way of example only, with reference to the Figures, in which.

DETAILED DESCRIPTION OF EMBODIMENTS

Figure 1:
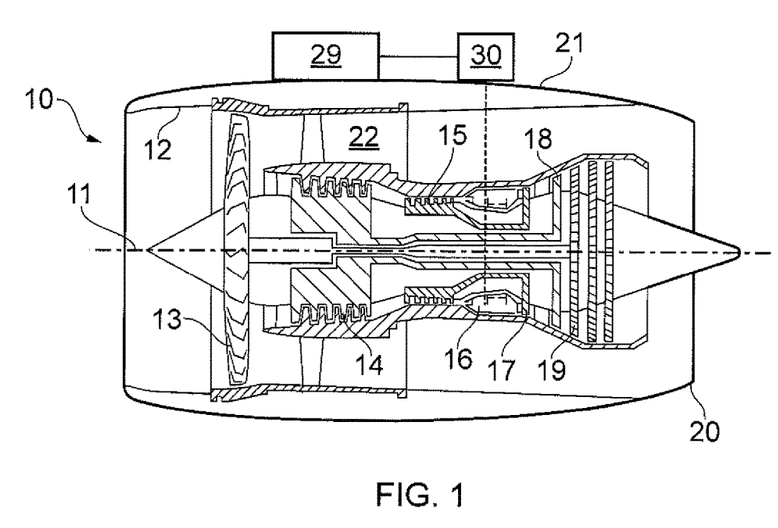
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

The gas turbine engine 10 requires fuel to be supplied to the combustion chamber 16. Shown schematically on FIG. 1, fuel may be supplied to the combustion chamber 16 from a fuel tank 29, and may pass through a centrifugal debris separator 30 located between the fuel tank 29 and the combustion chamber 16. Other components may exist between the fuel tank 29 and the combustion chamber 16.

Figure 2:
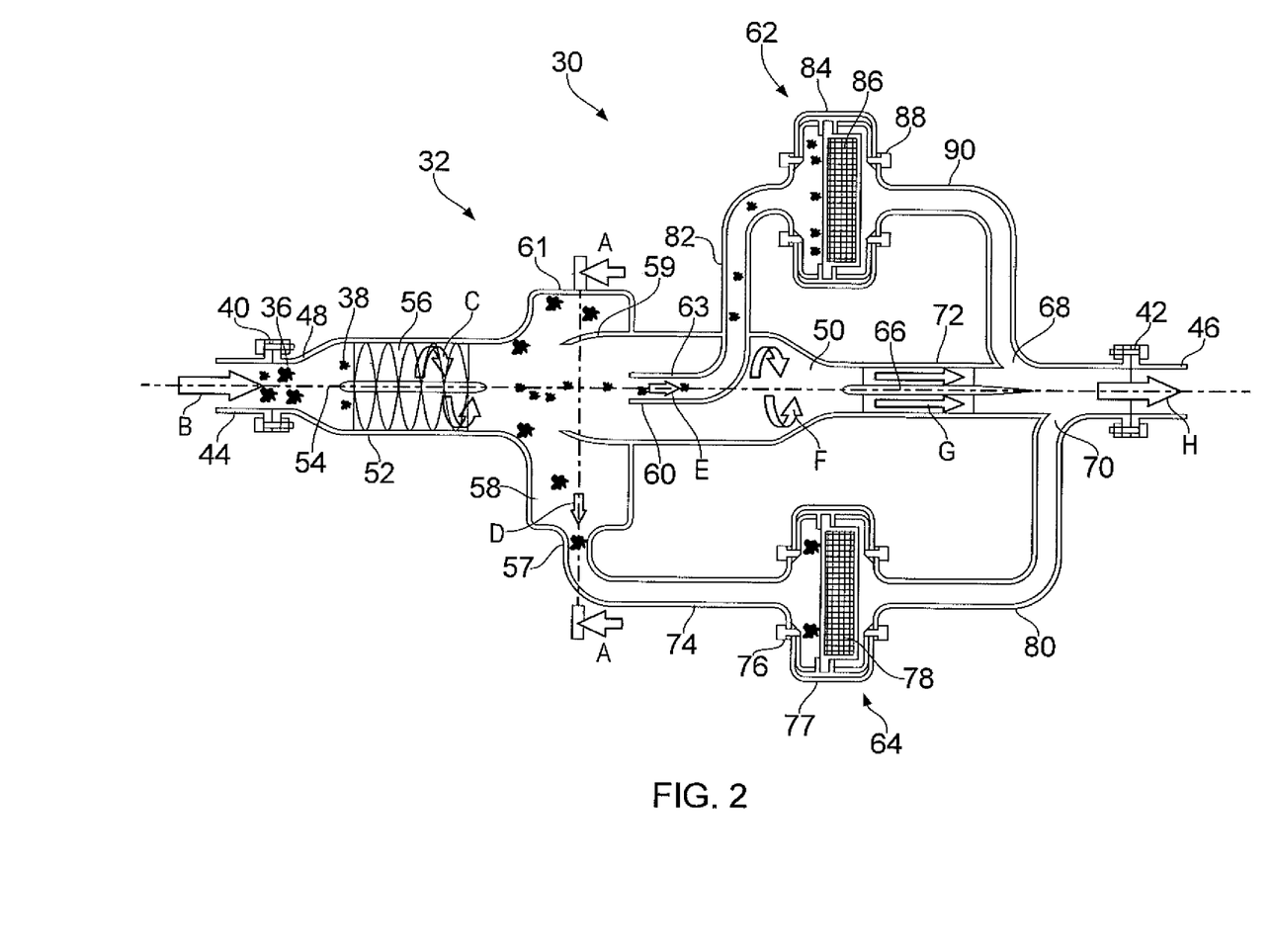
FIG. 2 is a sectional side view of a centrifugal debris separator according to an example of the present disclosure.

Referring to FIG. 2, a centrifugal debris separator is indicated generally at 30. The centrifugal debris separator 30 includes a separating chamber indicated generally at 32. A fluid flows into the centrifugal debris separator 30 as indicated by the arrow B. The fluid includes heavy debris particles 36 and light debris particles 38. The centrifugal debris separator includes a debris separator inlet 40 and a debris separator outlet 42. A fluid input pipe 44 and a fluid output pipe 46 connect to the centrifugal debris separator 30.

The separating chamber 32 includes a separating chamber inlet 48 and a first separator outlet 50. The separating chamber 32 includes an outer wall 52 and a separating chamber centreline 54. The separating chamber 32 includes a vortex generator 56, a second separator outlet 58 and a third separator outlet 60.

The centrifugal debris separator 30 includes a light debris filter arrangement 62 and a heavy debris filter arrangement 64. The centrifugal debris separator 30 includes a light debris return inlet 68 and a heavy debris return inlet 70.

Fluid enters the centrifugal debris separator 30 at the debris separator inlet 40 from the fluid input pipe 44. The flow then enters the separating chamber 32 by the separating chamber inlet 48. The separating chamber outer wall 52 is cylindrical in the FIG. 2 example, although other shapes/cross sections may be used. The outer wall 52 is the same diameter as the fluid input pipe 44 at the separating chamber inlet 48 in the FIG. 2 example. The outer wall 52 may increase in diameter downstream of the separating chamber inlet 48 as in the FIG. 2 example. The increase in diameter can accommodate a vortex generator 56 which may be a static obstruction of helical blades in the FIG. 2 example. The vortex generator 56 imparts rotational (or angular) momentum to the flow of fluid which can be seen by arrows C and acts to separate the heavy debris particles 36 to the outside of the rotating fluid, closest to the outer wall 52 of the separating chamber, and the light debris particles 38 to the inside of the rotating fluid, closest to the separating chamber centreline 54. In this regard "heavy debris particles" may be relatively more dense that "light debris particles" and/or the fluid itself. In the same way "Light debris particles" may be relatively less dense than "heavy debris particles" and/or the fluid itself.

The outer wall 52 of the separating chamber accommodates a circumferential recess formed of a second separator outlet wall 61 that may form the second separator outlet 58, as in the FIG. 2 example. The recess may be snail shell shaped, as in the FIG. 3 example which shows a cross section A-A through the second separator outlet 58. The downstream part of the outer wall 52 of the separating chamber 32 protrudes axially across the circumferential recess to create a flow separator 59. Part of the flow, that contains the greatest proportion of heavy debris particles 36, is channelled into the recess of the second separator outlet by the flow separator 59. The part of the flow channelled into the recess rotates around the recess, as shown by arrow D, until it reaches the second separator outlet port 57 which is a pipe that carries away the fluid containing the high proportion of heavy debris particles 36.

The third separator outlet 60 is formed of a third separator outlet wall 63, for example a pipe (or passageway) as in FIG. 2, which extends into the separating chamber 32. The pipe is formed around the centreline 54 of the separating chamber 32 so that it accepts the part of the flow that contains the greatest proportion of light debris particles 38. The flow into the pipe can be seen by the directional arrow E. The pipe includes a bend so that it leaves the separating chamber 32 through the outer wall 52.

A portion of the flow is neither separated by the second separator outlet 58 nor the third separator outlet 60. This flow is the flow that passes radially inside the flow separator 59 and radially outside of the third separator outlet 60. This flow contains a relatively low proportion of heavy debris particles 36 and light debris particles 38 compared to the flow that entered the separating chamber 32. The flow is still rotating shown by the arrows F. The separating chamber may then narrow to the diameter of the separating chamber inlet 48 just upstream of the first separator outlet 50, as in the FIG. 2 example, although this may not be the case. This flow leaves the separating chamber 32 at the first separator outlet 50.

The flow then enters a pipe section 72, which in the FIG. 2 example is cylindrical. Contained in the pipe section 72 is a flow straightener 66. The flow straightener 66 includes straight blades in the axial direction in the FIG. 2 example. The flow straightener removes the rotation of the fluid such that the flow proceeds in a straight axial direction shown by arrows G.

The flow that leaves the separating chamber 32 by the second separator outlet 58 passes along a pipe 74 to the heavy debris filter arrangement 64. The heavy debris filter arrangement 64 is formed of a heavy debris filter casing 77 that is releasably attached to the pipe 74 by bolts 76. A heavy debris filter 78 is contained within the heavy debris filter arrangement 64 and attached to the heavy debris filter casing 77. The heavy debris filter 78 filters out the heavy debris particles 36. The filtered flow then passes to a return pipe 80 which leads to the heavy debris return inlet 70 where it is returned and combined with the flow from the first separator outlet 50.

The flow that leaves the separating chamber 32 by the third separator outlet 60 passes along a pipe 82 to the light debris filter arrangement 62. The light debris filter arrangement 62 is formed of a light debris filter casing 84 that is releasably attached to the pipe 82 by bolts 88. A light debris filter 86 is contained within the light debris filter arrangement 62 and attached to the light debris filter casing 84. The light debris filter 86 filters out the light debris particles 38. The filtered flow then passes to a return pipe 90 which leads to the light debris return inlet 68 whereby it is returned and combined with the flow from the first separator outlet 50.

The flow that passes through the first separator outlet 50, the flow that is filtered by the heavy debris filter arrangement 64 and the flow that is filtered by the light debris filter arrangement 62 then pass through the debris separator outlet 42 to the fluid output pipe 46.

It will be appreciated that the arrangement shown in FIG. 2 can take any suitable form to achieve the intended purpose of removing heavy and light debris from the flow. For example, the central axis 54 of the centrifugal debris separator 30 may include bends and changes of direction. The input and output from the separating chamber 32 may be at angles to the central axis 54 (for example they may include a component of the circumferential direction) such that rotation of the fluid is imposed and removed by the input and output alone. The separating chamber 32 may have cross sections other than circular. The separating chamber 32 may include several changes in diameter along its length or changes in cross sectional shape along its length. The arrangement of the second separator outlet 58 and third separator outlet 60 may be of any suitable form and arrangement to remove heavy debris particles 36 and light debris particles 38 from the flow. The vortex generator 56 and flow straightener 66 may be of any suitable form that imparts and removes rotational momentum from the flow, or indeed may not be present, for example if the flow at or from the inlet already has appropriate swirl. The filter arrangements may be of any suitable form that removes the heavy debris particles 36 and light debris particles 38 from the flow. The filtered flows may be removed from the system altogether rather than being returned as described in relation to the FIG. 2 example.

The arrangement shown in FIG. 2 can allow for the filter and removal of light debris particles 38 and heavy debris particles 36 whilst allowing a portion of the flow to pass through the centrifugal debris separator 30 without being filtered and therefore not experience the pressure drop associated with a flow passing through a filter.

Figure 3:
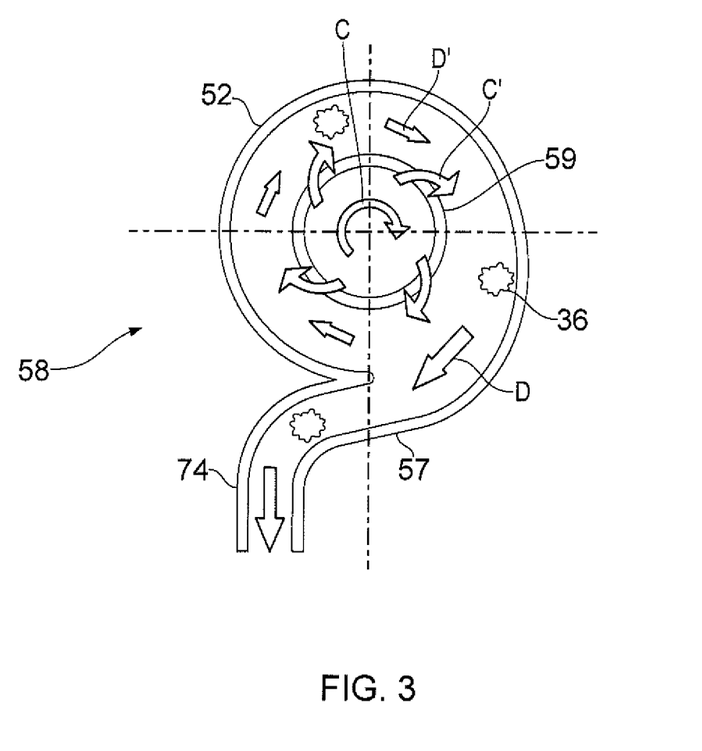
FIG. 3 shows a sectional axial view of a snail shell heavy debris separator according to an example of the present disclosure.

Referring to FIG. 3 the second separator outlet 58 is shown in cross section. The rotating flow C flows radially outwards C' to between the flow separator 59 and the recess of the outer wall 52 of the separating chamber 32. The flow then flows around the recess as shown by arrow D'. The depth of the recess in the outer wall 52 increases with radius and at the deepest point an outlet port 57 is presented to the recess. The flow D passes into the outlet port 57 and the direction of the outlet port 57 may be largely in the circumferential direction to accommodate the rotating flow. The outlet leads to a pipe 74.

Figure 4:
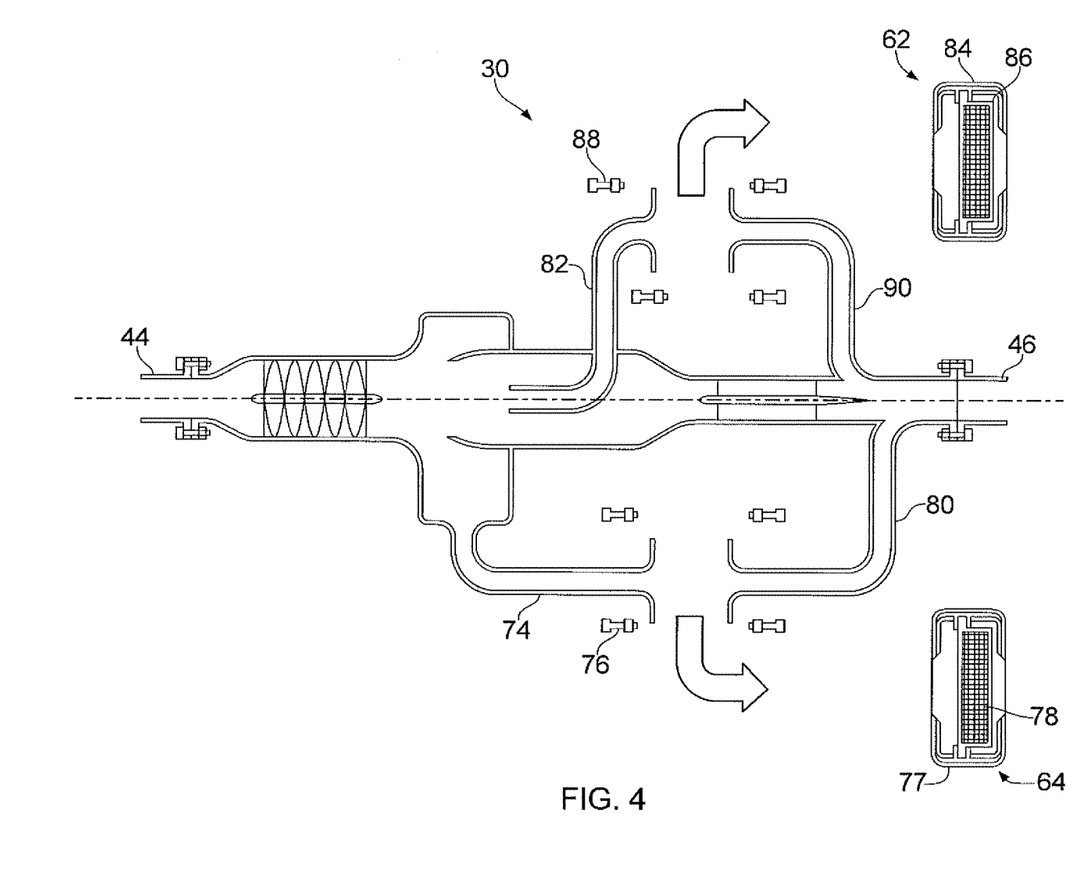
FIG. 4 shows a sectional side view of a centrifugal debris separator showing the removal of the heavy debris filter arrangement and light debris filter arrangement according to an example of the present disclosure.

Referring to FIG. 4 the removal of the filter arrangements is shown. The bolts 88 between the light debris filter casing 84 and the pipes 82, 90 are removed and the light debris filter casing 84 can be removed from its position in the centrifugal debris separator 30. Similarly, the bolts 76 between the heavy debris filter casing 77 and the pipes 74, 80 can be removed and the heavy debris filter casing removed from its position in the centrifugal debris separator 30. It will be appreciated that other attachments may exist between the filters and the pipes that will allow them to be removed. The removal of the filter arrangements advantageously can allow for at least repair and replacement of the filters.

Figure 5:
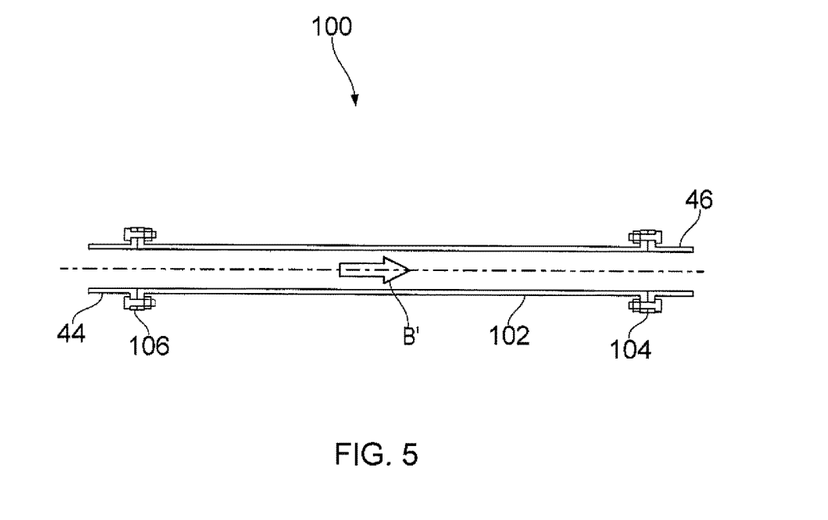
FIG. 5 shows a sectional side view of a replacement pipe connected between the fluid input pipe and the fluid output pipe according to an example of the present disclosure.

Referring to FIG. 5 a fluid supply apparatus 100 includes a fluid input pipe 44, a fluid output pipe 46 and a replacement pipe 102. The fluid supply apparatus 100 includes bolts 106 and 104. The bolts 106 attach the replacement pipe 102 to the fluid input pipe 44 and the bolts 104 attach the replacement pipe 102 to the fluid output pipe 46.

The fluid supply apparatus 100 can include a centrifugal debris separator 30, for example that shown in FIG. 2, instead of a replacement pipe 102. In a method of removing a centrifugal debris separator 30 from a fluid supply apparatus 100 the bolts 40 and 42, shown in FIG. 2, are removed and the centrifugal debris separator 30 can then be removed from the fluid input pipe 44 and fluid output pipe 46. The replacement pipe 102 can then be placed and attached to the fluid input pipe 44 by the bolts 106 and to the fluid output pipe 46 by the bolts 104.

When the fluid supply apparatus 100 includes the replacement pipe 102 the pressure losses across the system can be reduced compared to if the fluid supply apparatus 100 includes the centrifugal debris separator 30.

Figure 6:
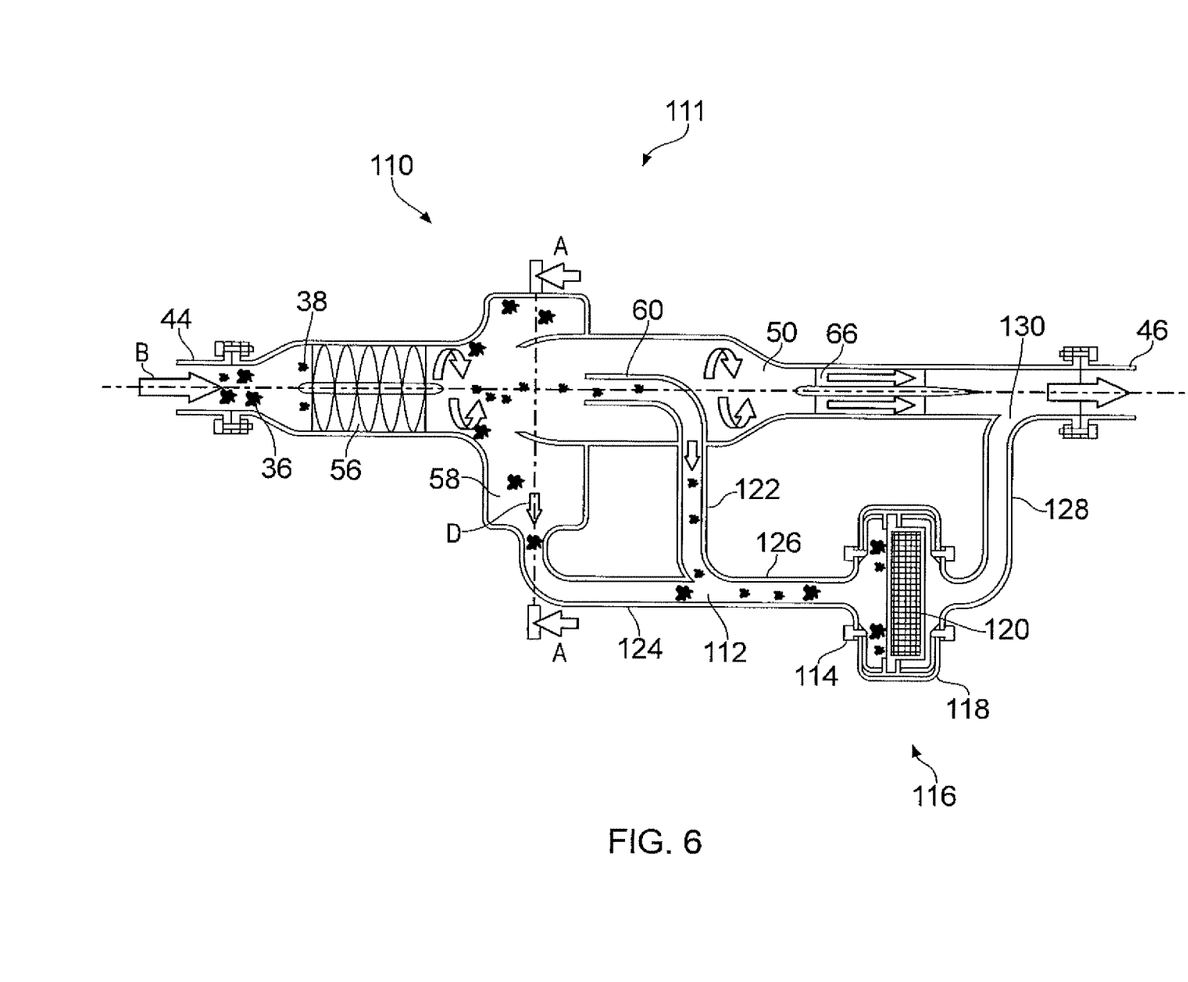
FIG. 6 shows a sectional side view of a centrifugal debris separator with a common filter arrangement according to an example of the present disclosure.

Referring to FIG. 6 a centrifugal debris separator is generally indicated at 110 that includes a common filter arrangement generally indicated at 116. The centrifugal debris separator 110 is attached between a fluid input pipe 44 and fluid output pipe 46. The centrifugal debris separator includes a vortex generator 56, a separating chamber 111, a first separator outlet 50, a second separator outlet 58, a third separator outlet 60 and a flow straightener 66. Like features between the FIG. 2 arrangement and the FIG. 6 arrangement are given like reference numerals, and will not be described in detail again in relation to FIG. 6.

The centrifugal debris separator 110 further includes a common flow junction 112 and a common filter arrangement 116.

The second separator outlet 58 leads to a pipe 124 and the third separator outlet 60 leads to a pipe 122. The two pipes 124 and 122 then combine to a single point at a common flow junction 112 that leads to a common pipe 126. The common pipe leads to common filter arrangement 116. The common filter arrangement 116 filters both the heavy debris particles 36 and light debris particles 38. The filtered flow then passes into a common return pipe 128 before being returned to the centrifugal debris separator 110 at the common return inlet 130. In an alternative arrangement, the pipes 122, 124 may not be combined to a common pipe 126, and instead may be provided directly to the filter arrangement 116.

The common filter arrangement 116 includes a common filter arrangement casing 118, common filter bolts 114 and a common filter 120. The common filter arrangement casing 118 is attached between the common pipe 126 and the common return pipe 128 by the bolts 114. It will be understood that the common filter arrangement can therefore be removed in the same way as the light debris filter arrangement 62 and the heavy debris filter arrangement 64. The common filter 120 is configured to remove both the heavy debris particles 36 and light debris particles 38. It will be understood that this function can be performed by more than one filter. For example, one filter could remove the heavy debris particles 36 and then another filter in series could remove the light debris particles 38.

Figure 7:
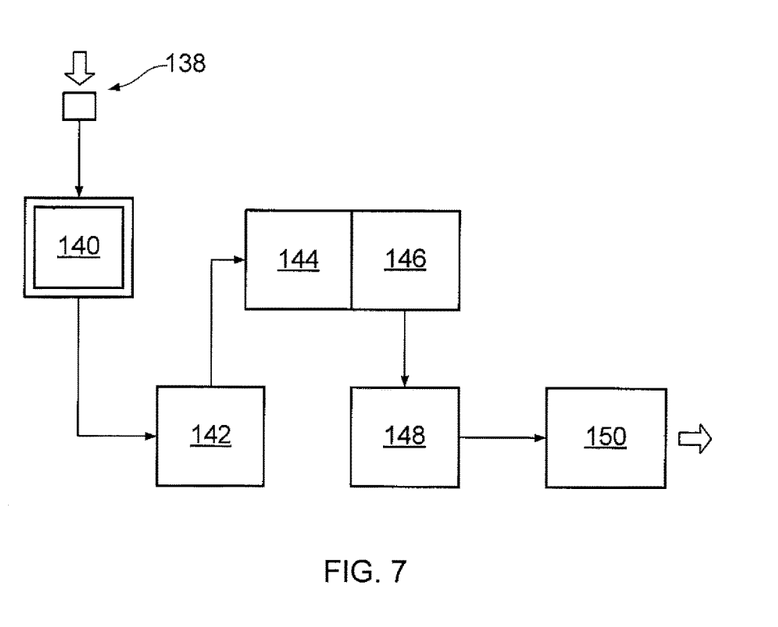
FIG. 7 shows a flow diagram of a fuel system of a gas turbine showing the placement of the centrifugal debris separator according to an example of the present disclosure.

Referring to FIG. 7 a centrifugal debris separator 140 is represented schematically in the fuel system of an aircraft. The centrifugal debris separator may be any centrifugal debris separator within the scope of the present disclosure, for example a centrifugal debris separator as described and/or claimed herein, such as the centrifugal debris separator 30, 110 of FIGS. 2 and 6. The fuel system includes a fuel supply 138, a low pressure (LP) fuel pump 142, a fuel oil heat exchanger 144, an LP fuel filter 146, a high pressure (HP) fuel pump 148 and a hydro mechanical unit 150.

The fuel enters the system from the aircraft at the fuel supply 138. As an example, the fuel system may be supplied with fuel from a fuel tank of an aircraft. The fuel may then pass through the centrifugal debris separator 140. The fuel may then pass through the LP (low pressure) fuel pump 142. The fuel may then pass through the fuel oil heat exchanger 144 and the LP fuel filter 146. The LP fuel filter 146 may have a much finer filtration than the filters of the centrifugal debris separator 140. The fuel may then pass through the HP fuel pump 148. The fuel may then pass through the hydro mechanical unit 150. The fuel may then pass to the engine core.

The centrifugal debris separator 140 may be used on other parts of the gas turbine engine. For example, the centrifugal debris separator 140 may be solely attached to the fuel tank of an aircraft to remove debris from the fuel tank without affecting the fuel supply line.

The centrifugal debris separator 140 can prevent the fuel oil heat exchanger 144 from blocking.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A centrifugal debris separator for removing debris from a gas turbine engine fuel system, comprising:
   a debris separator inlet;
   a debris separator outlet; and
   a separating chamber with a centreline extending in an axial direction and defined by an outer wall formed around the centreline, the separating chamber comprising:
      a separating chamber inlet for receiving fluid;
      a first separator outlet to the separating chamber;
      a second separator outlet to the separating chamber provided to the outer wall of the separating chamber;
      a third separator outlet to the separating chamber defined by a third separator outlet wall formed around the centreline of the separating chamber;
      a flow straightener downstream of the first separator outlet; and
      at least one filter downstream of the second separator outlet and the third separator outlet, wherein
   the debris separator inlet is fluidly connected to the separating chamber inlet,
   the debris separator outlet is fluidly connected to the first separator outlet, and
   the flow from the first separator outlet, the second separator outlet and the third separator outlet is rejoined downstream of the flow straightener and the at least one filter and upstream of the debris separator outlet.

2. A centrifugal debris separator according to claim 1 wherein the second separator outlet is defined by a second separator outlet wall, and the second separator outlet wall forms a spiral shape, in an axial plane, around the outer wall of the separating chamber.

3. A centrifugal debris separator according to claim 1 wherein the outer wall of the separating chamber has a circular cross section.

4. A centrifugal debris separator according to claim 3 wherein
   the third separator outlet wall has circular cross section; and
   the third separator outlet wall is radially closer to the centreline than the second separator outlet is to the centreline.

5. A centrifugal debris separator according to claim 1 wherein the third separator outlet is formed of a passageway that extends into the separating chamber.

6. A centrifugal debris separator according to claim 1 further comprising a vortex generator located upstream of the second separator outlet.

7. A centrifugal debris separator according to claim 1, wherein the at least one filter comprises a heavy debris filter arrangement that is fluidly connected to the second separator outlet.

8. A centrifugal debris separator according to claim 7 wherein the heavy debris filter arrangement comprises a release mechanism that allows the heavy debris filter arrangement to be removed.

9. A centrifugal debris separator according to claim 1, wherein the at least one filter comprises a light debris filter arrangement that is fluidly connected to the third separator outlet.

10. A centrifugal debris separator according to claim 9 wherein the light debris filter arrangement comprises a release mechanism that allows the light debris filter arrangement to be removed.

11. A centrifugal debris separator according to claim 1, wherein the at least one filter comprises a common debris filter arrangement that is fluidly connected to the second separator outlet and the third separator outlet.

12. A centrifugal debris separator according to claim 1 wherein the debris separator inlet is the separating chamber inlet and/or the debris separator outlet is the first separator outlet.

13. A fluid supply apparatus for a fuel system of a gas turbine engine comprising:
   a fluid input pipe;
   a fluid output pipe;
   a centrifugal debris separator according to claim 1, wherein
   the debris separator inlet is releasably attached to the fluid input pipe, and
   the debris separator outlet is releasably attached to the fluid output pipe.

14. A method of removing the centrifugal debris separator from the fluid supply apparatus according to claim 13, the fluid supply apparatus further comprising a replacement pipe configured to attach between the fluid input pipe and the fluid output pipe, the method comprising:
   removing the centrifugal debris separator by releasing the attachments between the centrifugal debris separator and the fluid input pipe, and the centrifugal debris separator and the fluid output pipe; and
   attaching the replacement pipe between the fluid input pipe and the fluid output pipe.

15. A fuel system debris separator for a gas turbine engine comprising a centrifugal debris separator according to claim 1 for removing heavy debris and/or ice from a gas turbine engine fuel.

16. A centrifugal debris separator according to claim 1, wherein the second separator outlet is upstream of the first and third separator outlets, the third separator outlet is upstream of the first separator outlet, and both the first and third separator outlets are aligned on the same axis as the debris separator inlet.

17. A method of separating debris from a fluid, containing light debris particles and heavy debris particles, flowing through a gas turbine engine fuel system centrifugal debris separator, the method comprising:
   rotating a flow of fluid about a rotational axis such that the density of the debris particles increases with distance from the rotational axis;
   separating an outer portion of the flow through a second separator outlet to the centrifugal debris separator;
   separating an inner portion of the flow through a third separator outlet to the centrifugal debris separator;
   ejecting the flow not included in the outer portion or the inner portion through a first separator outlet to the centrifugal debris separator;

directing the outer portion of the flow and the inner portion of the flow to at least one filter;

directing the flow ejected through the first separator outlet through a flow straightener; and rejoining (1) the outer portion of the flow, (2) the inner portion of the flow and (3) the flow ejected through the first separator outlet, downstream of the flow straightener and the at least one filter and upstream of a debris separator outlet.

18. A method of separating debris from a fluid according to claim 17, the method further comprising:

filtering the flow that has been separated by the second separator outlet and returning the filtered flow from the second separator outlet back to the centrifugal debris separator; and filtering the flow that has been separated by the third separator outlet and returning the filtered flow from the third separator outlet back to the centrifugal debris separator.

19. A centrifugal debris separator for removing debris from a gas turbine engine fuel system, comprising:

a debris separator inlet;

a debris separator outlet; and a separating chamber with a centreline extending in an axial direction and defined by an outer wall formed around the centreline, the separating chamber comprising:

a separating chamber inlet for receiving fluid;

a first separator outlet to the separating chamber;

a second separator outlet to the separating chamber provided to the outer wall of the separating chamber; and a third separator outlet to the separating chamber defined by a third separator outlet wall formed around the centreline of the separating chamber, wherein the debris separator inlet is fluidly connected to the separating chamber inlet, the debris separator outlet is fluidly connected to the first separator outlet, the separating chamber includes a second separator outlet wall including a first end extending to a second end, a radius of the second separator outlet wall expands from the first end to the second end forming a spiral shape, and the first end and the second end are circumferentially aligned with the second end being positioned radially outward of the first end, the first end and the second end forming the second separator outlet.

20. A centrifugal debris separator for removing debris from a gas turbine engine fuel system, comprising:

a debris separator inlet;

a debris separator outlet; and a separating chamber with a centreline extending in an axial direction and defined by an outer wall formed around the centreline, the separating chamber comprising:

a separating chamber inlet for receiving fluid;

a first separator outlet to the separating chamber;

a second separator outlet to the separating chamber provided to the outer wall of the separating chamber;

a third separator outlet to the separating chamber defined by a third separator outlet wall formed around the centreline of the separating chamber, wherein the debris separator inlet is fluidly connected to the separating chamber inlet, the debris separator outlet is fluidly connected to the first separator outlet, the second separator outlet is upstream of the first and third separator outlets, the third separator outlet is upstream of the first separator outlet, and both the first and third separator outlets are aligned on the same axis as the debris separator inlet.

* * * * *